United States Patent [19]

Morman et al.

[11] Patent Number: 5,930,315
[45] Date of Patent: Jul. 27, 1999

[54] PROCESS MANAGEMENT USING COMPONENT THERMAL-HYDRAULIC FUNCTION CLASSES

[75] Inventors: James A. Morman, Woodridge; Thomas Y. C. Wei, Downers Grove; Jaques Reifman, Western Springs, all of Ill.

[73] Assignee: The United States of America as represented by the United States Department of Energy, Washington, D.C.

[21] Appl. No.: 08/989,360

[22] Filed: Dec. 12, 1997

[51] Int. Cl.[6] .................................................... G21D 3/04
[52] U.S. Cl. ......................... 376/216; 702/183; 702/184; 706/915
[58] Field of Search .................................... 376/215, 216, 376/245, 259; 702/182, 183, 184, 185; 706/915; 701/99; 364/528.22, 528.27

[56] References Cited

U.S. PATENT DOCUMENTS 5,265,035  11/1993  Reifman et al. .......................... 376/245
5,442,555  8/1995  Reifman et al. .......................... 376/215

*Primary Examiner*—Daniel D. Wasil
*Attorney, Agent, or Firm*—Bradley W. Smith; Mark LaMarre; William R. Moser

[57] ABSTRACT

A process management expert system where following malfunctioning of a component, such as a pump, for determining system realignment procedures such as for by-passing the malfunctioning component with on-line speeds to maintain operation of the process at full or partial capacity or to provide safe shut down of the system while isolating the malfunctioning component. The expert system uses thermal-hydraulic function classes at the component level for analyzing unanticipated as well as anticipated component malfunctions to provide recommended sequences of operator actions. Each component is classified according to its thermal-hydraulic function, and the generic and component-specific characteristics for that function. Using the diagnosis of the malfunctioning component and its thermal hydraulic class, the expert system analysis is carried out using generic thermal-hydraulic first principles. One aspect of the invention employs a qualitative physics-based forward search directed primarily downstream from the malfunctioning component in combination with a subsequent backward search directed primarily upstream from the serviced component. Generic classes of components are defined in the knowledge base according to the three thermal-hydraulic functions of mass, momentum and energy transfer and are used to determine possible realignment of component configurations in response to thermal-hydraulic function imbalance caused by the malfunctioning component. Each realignment to a new configuration produces the accompanying sequence of recommended operator actions. All possible new configurations are examined and a prioritized list of acceptable solutions is produced.

16 Claims, 5 Drawing Sheets

PROCESS MANAGEMENT USING COMPONENT THERMAL-HYDRAULIC FUNCTION CLASSES

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

FIELD OF THE INVENTION

This invention relates generally to the management and control of an operating system carrying out a nuclear, chemical or other process and is particularly directed to the detection and identification of a faulty component in an operating system and the analysis and determination of optimum response to manage of the system following failure of a system component.

BACKGROUND OF THE INVENTION

Complex engineering systems such as nuclear power plants are often subjected to off-normal situations that arise from component malfunctions, operational transients or external events. As system complexity increases, the demands on plant operators for fast, accurate responses to these events also increase, to the point where a computer-based advisory system to supplement operator training is highly desirable.

Operation of these systems, especially those with the potential for severe consequences in the event of an off-normal occurrence, requires the assimilation and processing of large amounts of data from system monitoring equipment. Installations such as power plants, chemical processing plants and fuel fabrication plants can all benefit from the application of computer-based expert systems to provide input to the operators as an aid in the diagnosis of plant faults and transient recovery. Such a system could extend the expertise of the operators to situations beyond their training envelope and provide rapid assistance during low-probability events requiring an extended time for the operators to diagnose and develop a response.

Research and development efforts in the area of operator-assistance systems for the diagnosis and management of plant transients, especially in nuclear power plants, have been in progress for many years, with various approaches and varying degrees of success. Typical systems are based on signal pattern recognition and simulator engines, or expert systems, that incorporate automated reasoning and neural network algorithms. It is highly probable that as the availability of low-cost, high-performance computers increases, operator advisory systems will be a standard feature of future generation plants. The systems will be used to aid in the diagnosis of component failures or off-normal events, as well as in the management of the plant transients that often follow such events.

Prior expert system approaches are limited to the use of predetermined sets of malfunction and associated operator actions which do not account for unanticipated malfunctions. Examples of this type of process fault diagnosis in control systems can be found in U.S. Pat. Nos. 5,265,035 and 5,442,555, assigned to the assignee of the present application. The disclosures of these two patents are hereby incorporated by reference in the present application. The present invention takes into account both anticipated and unanticipated system component malfunctions to provide realignment procedures and operator actions at on-line speeds to allow the system to be either safely shut down or to continue operation at full or partial capacity.

OBJECTS AND SUMMARY OF INVENTION

Accordingly, it is an object of the present invention to automatically determine the optimum recovery actions and configuration state of an operating system following a component malfunction in the system.

It is another object of the present invention to provide rapid on-line process management of an operating system following the malfunction of a component within the system by selecting new system operating configurations to maintain system operation at full, or partial, capacity, or to safely shut down the system.

A further object of the present invention is to take into account anticipated as well as unanticipated component malfunctions in an operating system to allow the system to be realigned or reconfigured so as to, for example, by-pass or isolate the malfunctioning component at on-line speeds so that the system may be safely shut down or may be allowed to continue operation at full or partial capacity.

A still further object of the present invention is to provide a process management system which can be applied to virtually any type of operating plant, such as of the nuclear, chemical or fuel fabrication type, without the need for major revisions of the system's computer code or the associated requirements for verification and validation of a modified code. Specific plant operating parameters and configurations are contained in a separate module that is linked to the main body of the code.

This invention contemplates a method for managing the operation of a system having a plurality of components following a malfunction of a component, wherein each component is assigned a thermal-hydraulic function in terms of mass, momentum or energy, the method comprising the steps of: assigning each component to a loop in the system, wherein each component in a given loop is connected to the other components in the given loop and each loop has a characteristic set of thermal-hydraulic parameters and each component be a set of thermal-hydraulic component characteristics; identifying a first malfunctioning component in a first loop and classifying the malfunction in terms of a mass, momentum or energy thermal hydraulic function; searching the loops for components connected to said first malfunctioning component; searching the first loop for a second component of the loop of the same thermal-hydraulic function type as the first malfunctioning component; generating a first modified loop structure wherein the second component having the same thermal-hydraulic function type as the malfunctioning component replaces the first malfunctioning component; calculating and comparing thermal-hydraulic parameters of the first modified loop incorporating the second component with the thermal-hydraulic parameters of the loop incorporating the first component prior to the malfunction; and reconfiguring the system to include the second component in the first modified loop if the thermal-hydraulic parameters of the modified loop and the loop incorporating the first component prior to the malfunction match; or generating a second modified loop structure incorporating a third component having the same thermal-hydraulic function type as the malfunctioning component for replacing the first malfunctioning component if the thermal hydraulic parameters of the first loop and of the first modified loop do not match; calculating and comparing thermal-hydraulic parameters of the second modified loop structure incorporating the third component with the thermal-hydraulic parameters of the loop incorporating the first component prior to the malfunction; and reconfiguring the system to include the third component in the second modified loop structure if the thermal-hydraulic parameters of the second modified loop match the thermal-hydraulic parameters of the first loop. This loop construction procedure is repeated until all possible loops with parameters matching the failed loop have been constructed and their replacement potential analyzed.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

DETAILED DESCRIPTION OF PREFERRED EMBODIMENT

Figure 1:
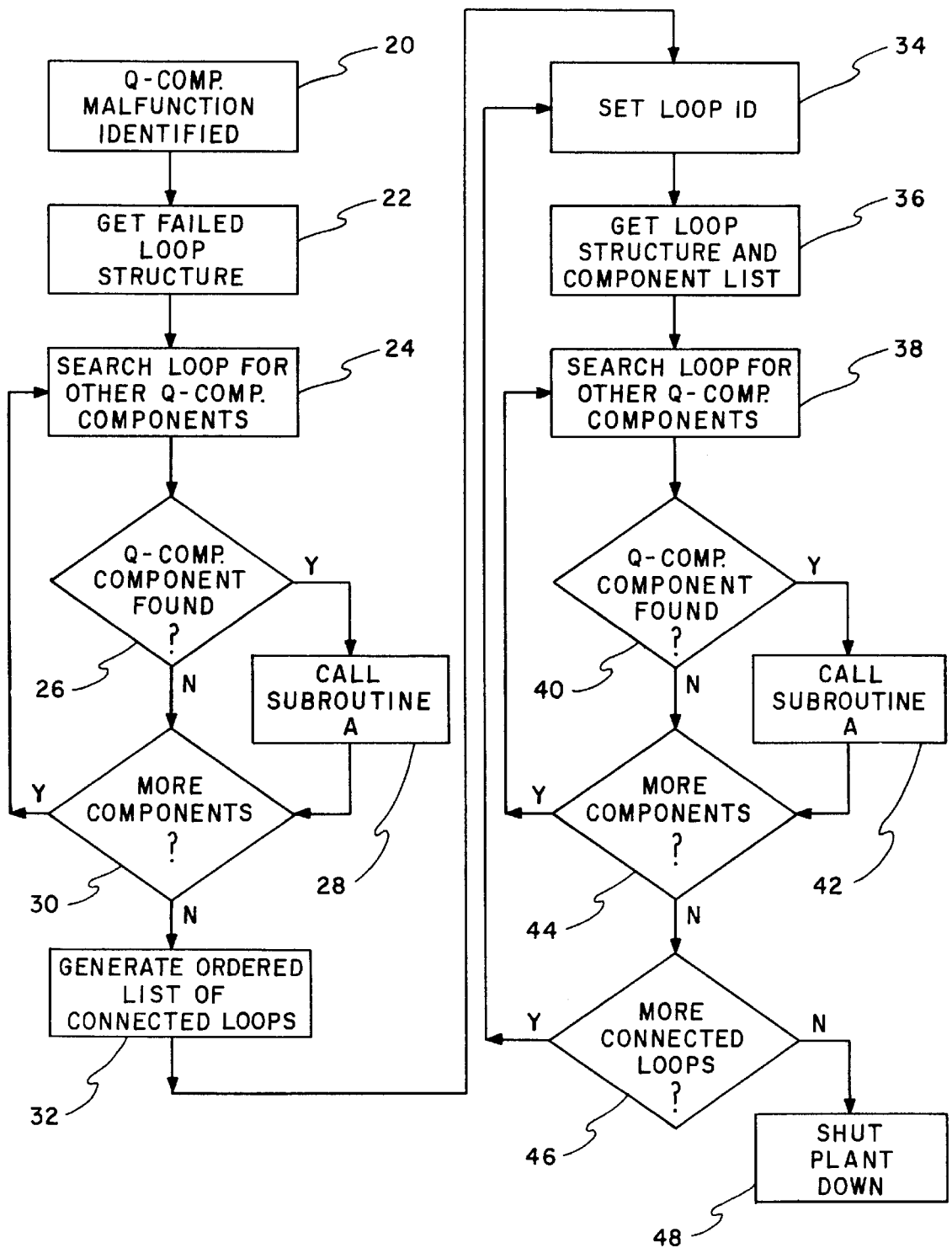
FIG. 1 is a simplified flowchart of the main module of the transient management system using the loop-component search approach of the present invention.

The present invention is adapted for use with and receives inputs from a fault detection and diagnosis system for an operating system such as a nuclear power plant, a chemical processing plant or a fuel fabrication plant. The present invention responds to the outputs of the fault detection and diagnosis system and will operate with virtually any type of fault detection and diagnosis system. One such type of system with which the present invention has been combined is the PRODIAG system developed at Argonne National Laboratory and described in U.S. Pat. Nos. 5,265,035 and 5,442,555.

The detection and diagnosis system identifies a failed component type (mass, momentum, energy, e.g., pump, valve, heat exchanger) and its location in the plant system. Rather than rely on a definition of systems and subsystems and the creation of a System Classification Dictionary, the loop-component search approach of the present invention is based on a component search through a set of connected loops whose components are characterized in a Component Classification Dictionary (CCD). Using a modular interface to the process plant schematics, the structure of the loop with the failed component is defined by an ordered list of its components. The loops may be closed or open, and connect to other loops at junctions or tanks. Using the loop structure, the transient management module of the present invention searches for replacement components of the same function type within the affected loop. If a replacement component is identified, the program calculates (using a database or simulation routine) the capacity of the reconfigured loop to determine if it matches the thermal-hydraulic parameters of the original loop.

If no replacement component is found in the affected loop, the program begins a forward search for important components serviced by the affected loop; starting at the failure site (or the boundary of the failure region, to the extent that the fault detection and diagnosis system has localized it) and working downstream within the loop and all connected loops. As used herein, the term "upstream" means in a direction counter to the direction of flow of the material being processed or controlled, while the term "downstream" means in the direction of flow of the material being processed or controlled. In addition, while the process transient management module of the present invention may be used with virtually any fault detection and diagnosis system, the following description relates to use of the present invention with the PRODIAG process transient diagnostic module developed at Argonne National Laboratory. The process transient management module of the present invention is known as PROMANA. Once all important components have been identified, the program begins a reverse search (upstream) starting at the inlet of each of the important components, one at a time. All possible loops with the potential to provide a replacement for the failed component loop are constructed. Once a connected loop has been identified, it is searched for a suitable replacement component. If one is found, the characteristics of the reconfigured loop are evaluated to ensure that the requirements of all high-level system functions and important components are satisfied. If any requirement is not satisfied, the search continues through other connected loops until a suitable replacement is identified, or until the search fails.

This approach eliminates the necessity of creating a System Classification Dictionary. It also eliminates the need for a priori definitions of systems and subsystems based on plant functions. With some modifications, the Component Classification Dictionary structure developed for PRODIAG was used to define the components and their relationships in the plant loops for use with the present invention.

Figure 2:
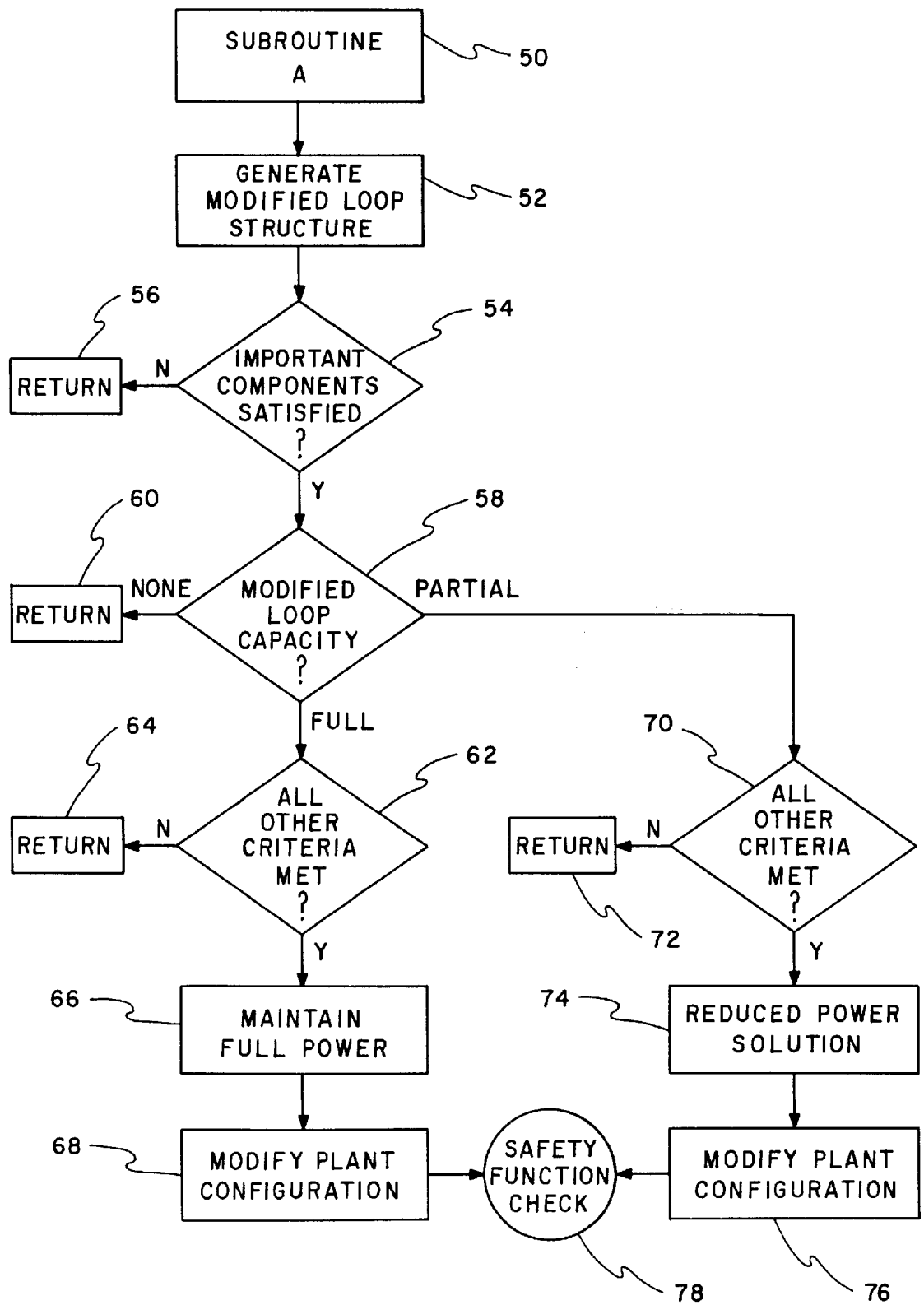
FIG. 2 is a simplified flowchart of a subroutine carried out in the transient management system shown in FIG. 1.

The loop decomposition with component search approach was selected to be developed into the transient management system of the present invention. FIGS. 1 and 2 are flowcharts illustrating the sequence of steps taken upon receipt of a signal from PRODIAG that a fault has occurred in the process system being monitored. A description of the logical path through the flowcharts is provided. These flowcharts are representative of the general search engine, and minor modifications may be made as necessary for malfunctions of each of the three functional component types (mass, momentum, energy).

In the flowcharts, a square or rectangle represents the carrying out of an operation or task, a diamond represents a decision point based upon the comparison of measured or designated system parameters, and a circle represents a system safety check.

The steps carried out in the process implemented in the main module of the transient management system of the present invention will now be described with reference to FIG. 1.

1. A malfunction is signaled at step 20 by PRODIAG, or the fault detection diagnosis system, which identifies it by function type (mass, momentum or energy), loop location and, if possible, a specific component (or list of possible fault components).

2. Using the interface to the process plant Piping and Instrumentation Diagram (PID), the structure of the malfunctioning loop is retrieved at step 22. The loop structure consists of an ordered list of components arranged in the direction of normal flow. Loops can be closed (i.e. same first and last component) or open (first and last components or junctions or tanks). Except for common junctions or tanks, no component is contained in more than one loop. The Component Classification Dictionary is used to assign one of the three basic function types to each component.

3. The loop component list is searched at step 24 for other components of the same function type (designated as Q-COMP components in FIG. 1) as the faulty component.

4. If a component of the same type is found at step 26, the program branches to Subroutine A at step 28 to check the parameters of the loop with the replacement component. Subroutine A is described in detail below with reference to FIG. 2. If any of the tests in Subroutine A fail, control is returned to the main module shown in FIG. 1.

5. If there are more components in the faulty loop, the search continues at step 30, repeatedly calling Subroutine A when a component of the same function type is found. This continues until a satisfactory replacement component is found, or until no more components of that type remain in the affected loop.

6. If no suitable replacement component is found in the affected loop, the program uses the loop structure to generate an ordered list of connected loops at step 32 by searching in the forward mode (downstream) for important components, starting at the failure location and then searching upstream to conduct the connected loops.

7. Starting with the first loop in the list at step 34, the loop identification is used at step 36 to get the connected loop structure, component list and component functions.

8. At this point, the program performs a search at step 38 for components of the same function type carried out in steps 40, 42 and 44, similar to previously described steps 26, 28 and 30.

9. If the end of the connected loop is reached and no suitable replacement component has been found, the program continues to the next connected loop at step 46 and repeats steps 34 and 36. This is a reentrant section of the transient management module, since each connected loop will normally have connections of its own to follow.

10. If all connected loops have been searched and no suitable component has been found, the transient management module solution is to shut down the plant (which was assumed to be in a normal, full-power operating mode before the fault was detected) at step 48. A safety function check may also be required at this point. If a suitable replacement component was found, the program exits from Subroutine A with the solution.

The steps carried out in Subroutine A shown in FIG. 2 are described in detail in the following paragraphs.

A1. As shown in FIG. 2, Subroutine A is initiated at step 50 and performs several functions. First, at step 52 it generates a modified loop structure with the new component in place to replace the faulty component (or set of components identified by PRODIAG). Eventually, this step will include modifications that locate valves to isolate failed components.

A2. Subroutine A then checks at step 54 to see if the reconstructed loop provides the target function (mass, momentum or energy) to all important components serviced by the original loop. Important components are defined by their function, and are typically energy and mass components. If any requirement of any important component is not satisfied, Subroutine A returns control to the main module at step 56 and the search continues.

A3. The transient management module then calculates at step 58 the thermal-hydraulic parameters of the reconfigured loop and compares the results to those of the original loop configuration. This calculation will use either simple thermal-hydraulic models, a list of previously calculated values, or a plant simulator. A decision is made that the modified loop can provide full, partial or no replacement capacity, based on the result of the calculation.

A4. If the modified loop provides none of the original loop capacity, Subroutine A returns control to the main program at step 60 to continue the search.

A5a. If the modified loop provides a fraction of the original loop capacity, Subroutine A at step 70 checks to see if using the new component entails any other criteria that must be met, such as tank or sump capacity. If any auxiliary criteria exist and are not met, Subroutine A returns control to the main program at step 72 to continue the search.

A6a. If there are no other criteria, or if the other criteria are met, a potential solution at reduced power is found at step 74. The program then resets the plant state to conform to the new loop configuration at step 76 and then proceeds to do a safety function check at step 78.

A5b. If the modified loop provides the full capacity of the original loop, Subroutine A program checks at step 62 to see if using the new component entails any other criteria as in step 70. If any auxiliary criteria exist and are not met, the subroutine returns control to the main program at step 64 to continue the search.

A6b. If there are no other criteria, or if the other criteria are met, a full power solution is found at step 66. The program resets the plant state to conform to the new loop configuration at step 68 and then proceeds to do a safety function check at step 78.

Once a new plant state has been reached due to component replacement and loop reconfiguration, Subroutine A checks at step 78 to ensure that all safety function requirements are still met. These functions in a nuclear power station would include keeping the core covered, maintaining core temperature within limits, etc.

The safety function check consists of retrieving a preprogrammed set of high-level safety functions, then deciding if the modified loop has any potential impact on those functions. If the modified loop might have an effect, a calculation is performed to verify that the safety functions are still maintained within prescribed limits.

The safety function check routine at step 78 returns control to the transient management system main module shown in FIG. 1 to continue the search for a workable solution. Each potential solution is stored so that a prioritized list of recommendations can be presented to the plant operator. Prioritization may be done according to a set of criteria added to the program, some form of probabilistic risk assessment or a faster-than-real-time simulator.

Several examples have been used to test and verify the logic of the inventive transient management module. The responses of the transient management module to various hypothesized faults in the Chemical Volume and Control System (CVCS) of the Braidwood nuclear power plant in Braidwood, Ill. are discussed in the following paragraphs.

Figure 3:
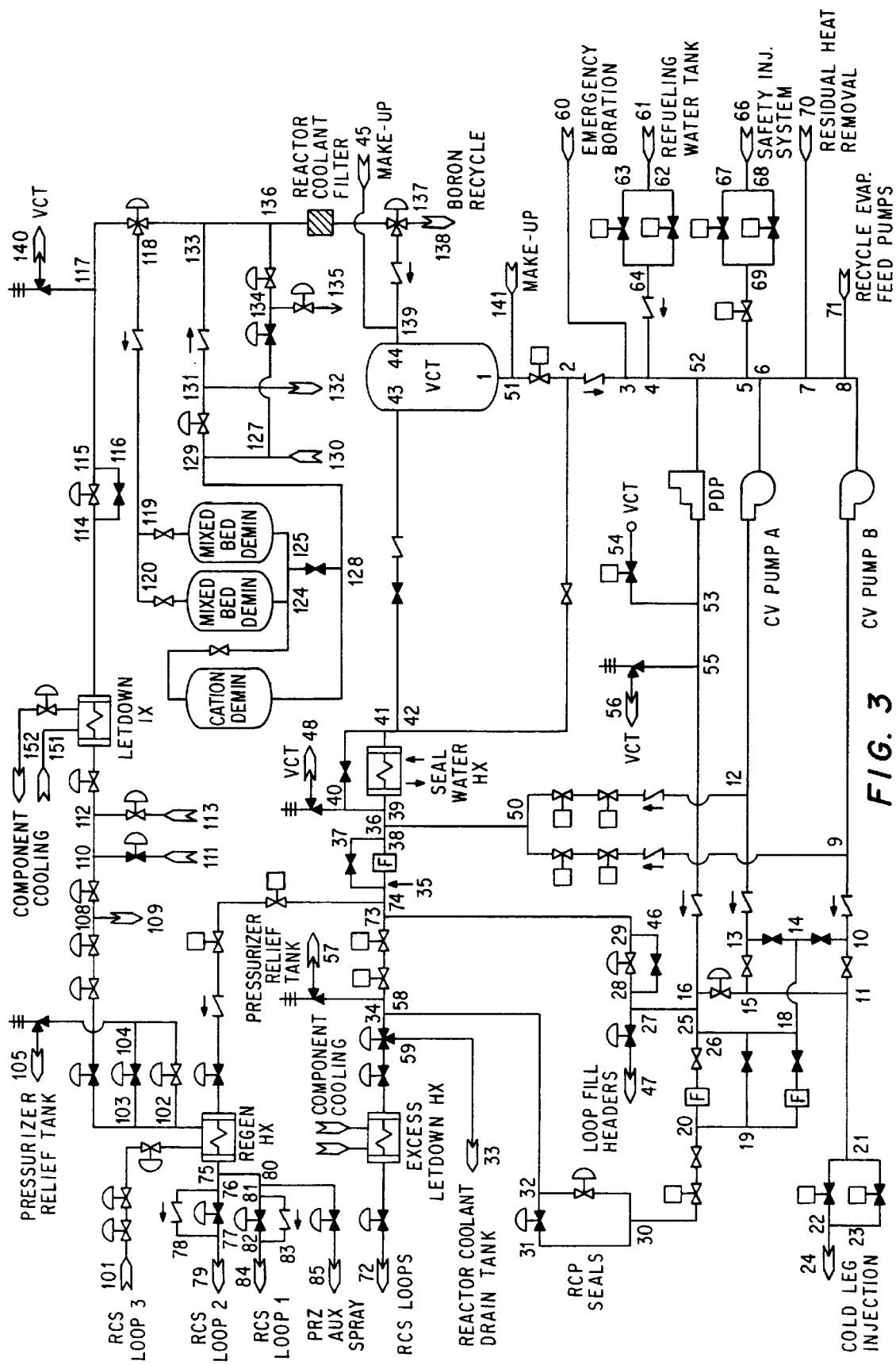
FIG. 3 is a simplified schematic diagram of a sample chemical volume and control system (CVCS) with which the present invention is intended for use.

Four sample faults have been processed according to the logic of the module described above, using a subset of a typical CVCS system from a nuclear power plant. FIG. 3 shows a partial diagram of the CVCS.

Diagnostic Results Usage

Once PRODIAG, the process transient diagnostic module, performs the diagnostics for the thermal-hydraulic system transient initiator and identifies the malfunctioning component, the operator advisor provides assistance in recommending sequences of operator actions which would aid in managing the thermal hydraulic (T-H) system response to the transient. This assistance is provided by the process transient management module of the present invention. The process transient management module uses knowledge of the malfunctioning component identified by PRODIAG and provides possible sequences of operator actions which would continue to meet process specifications and maximize reliability and minimize risk in response to the transient initiator. This may be in the form of actions to compensate for the loss of the malfunctioning component and keep the plant operating or actions to optimally bring the plant to other operating states.

In the following paragraphs, the knowledge-base structuring concepts along the lines of the three databases, the PRD (Physical Rules Databases), CCD (Component Classification Dictionary), and PID (Piping and Instrumentation Diagram), utilized in the inventive process transient management module are described.

The knowledge-base structuring of the inventive process transient management module is at a very basic level, component-level structuring, and not at a higher level, system-level structuring. This necessitates the usage of the generic component-level classification dictionary, the CCD, and obviates the usage of the generic system-level classification dictionary, the SCD. This basic level classification is required because a system could have more than one of the three T-H functions, $Q_{mass}$ (mass), $Q_{mom}$ (momentum), or $Q_{eng}$ (energy) In contrast, it is easier to classify the T-H function on a component level. Using the CCD concept places the inventive process transient management module on the same footing as PRODIAG. Similarly to PRODIAG, in addition to T-H function, the invention also uses T-H characteristics (attributes both qualitative and quantitative). There are, however, differences in that the T-H attributes useful for transient management are not exactly the same as those useful for T-H diagnostics. But in general, both the inventive process transient management module and PRODIAG use the first principles T-H function/T-H characteristics approach derived by Argonne National Laboratory for the knowledge-base structuring.

The major difference between the invention and PRODIAG in the knowledge-base structuring has been in the loop decomposition of the T-H system. The decomposition of the T-H system into a number of interfacing loops was carried out in PRODIAG manually. This process has been automated in the present invention. In the present invention, the T-H system has been broken down by the junctions (intersections of piping) and then PRD rules have been developed to connect the junctions into T-H loops. This is described below. This is necessary at the basic level in the search for alternative T-H pathways which are then translated into a set of suggested operator actions on individual components. In a sense, this particular part of the inventive process transient management module can be used as a complement to PRODIAG to automatically generate the T-H loops required for the PRODIAG diagnostics. This development contributes to the generic portability of the PRODIAG/PROMANA package which was one of the initial criteria specified for the development of the knowledge-base structure. It can also be used if the PRODIAG/PROMANA package is utilized off-line to generate higher-level expert system rules or expert systems (ESs), presumably computationally faster, for on-line transient diagnostic and management using the higher level SCD.

Figure 4:
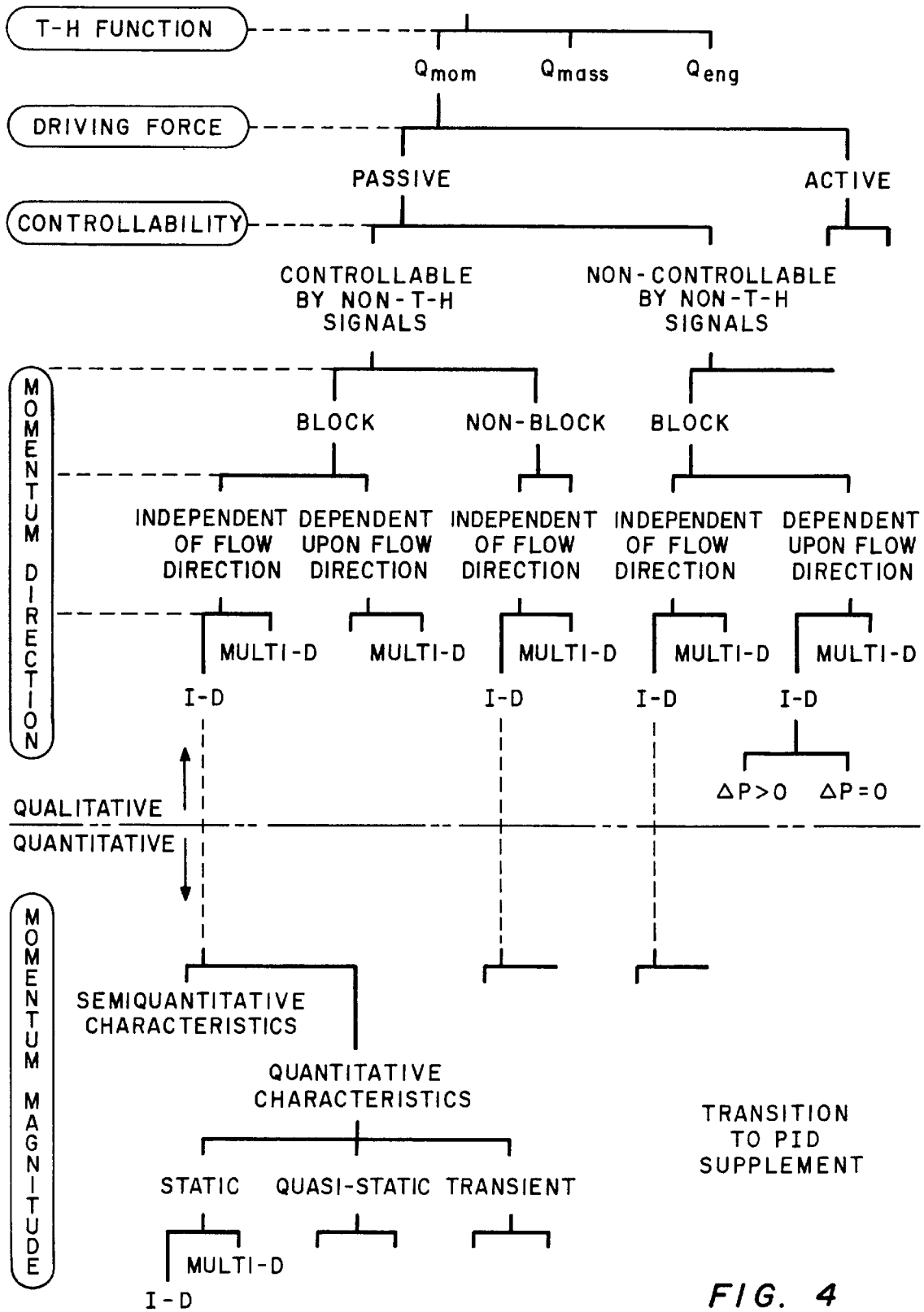
FIG. 4 is a simplified schematic diagram of a classification scheme for components by thermal-hydraulic function/attributes for use in the present invention.
Figure 5:
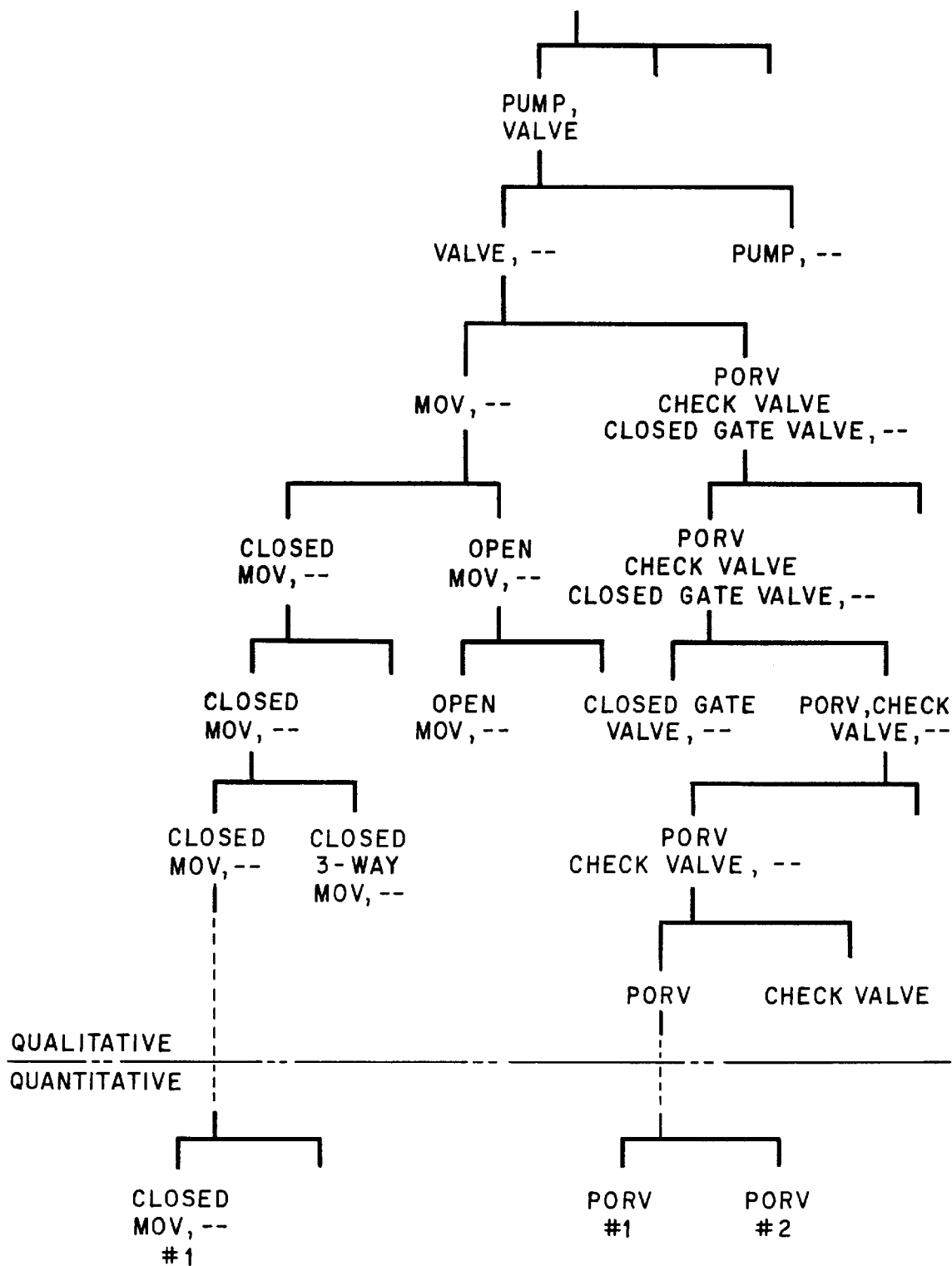
FIG. 5 is a simplified schematic diagram of an overlay of groups of generic components on the thermal-hydraulic function/attributes arrangement of FIG. 4.

The CCD is a generic grouping of generic component types. It is a classification of components by T-H function/attributes. FIGS. 4 and 5 show an integration of these two perspectives for the CCD used in the present invention. FIG. 4 is a classification by T-H function/attribute. FIG. 5 is an overlay of groups of generic components on the FIG. 4 T-H function/attributes. We concentrate on FIG. 4 first. At the top level the T-H function classification is, as in PRODIAG, by $Q_{mass}$, $Q_{mom}$ and $Q_{eng}$. Under the T-H function of $Q_{mom}$ it can be seen that the momentum attributes which are important to process transient management are not those which are important, or at least of different priority, to process transient diagnostics. In terms of attribute groups, the important attributes are those which are relevant to the driving force, the controllability, the direction of the momentum and finally the magnitude of the momentum. Passive momentum components require an active momentum component to provide the driving force. Non T-H signals such as electric current to a valve positioner or a motor can provide controllability not dependent upon the thermal hydraulic variables of flow, pressure, temperature and level.

But there is a class of components which can not be controlled by these non T-H signals. Some of these do, however, respond to the T-H signals such as a change in pressure level without having to convert to an electric signal during a mechanical actuation of some kind. The next component attribute which is important in the management of momentum are those which contribute to the management of the momentum direction. There is a group of components which block the momentum (or flow), and there is a group of components which do not block the momentum.

Within these groups the blocking can be independent of momentum direction or the blocking can be dependent upon the momentum direction. After this attribute group important for momentum direction, the next important attribute is whether the management of momentum direction can be only done for one direction/dimension or for a multiple of directions/dimensions.

The next large class of attributes belong to those which are important for the management of the magnitude of the momentum (flow). At this point the attributes become less qualitative and more quantitative in nature. These attributes may more appropriately belong to a PID supplement rather than to the CCD. Specific valve characteristics are definitely more useful to a quantitative simulation calculation rather than a qualitative momentum direction analysis. The PID as envisioned only contains the geometrical configuration information. The plant specific topology is stored in the PID. In our approach to date, the PRD and CCD are not changed as the process transient management module is ported from T-H system to T-H system and from plant to plant. However, management of momentum so that technical criteria such as capacity specifications are met would also require management of momentum magnitude. The PID supplement if chosen as the solution, would be required to contain the quantitative momentum characteristics required to perform the quantitative calculations. In the context of FIG. 4, the required momentum characteristics (attributes) can be classified by the type of detail/sophistication of the calculation which needs to be performed. The first differentiation is to be made between semi-quantitative and quantitative characteristics. Semi-quantitative characteristics such as the sign of the gradient of a head vs. flow curve would be used in semi-quantitative trend analysis for the T-H variables. The quantitative characteristics can be clarified according to the temporal frequency band of the T-H response analysis; static, quasi-static or full transient solution. Further classification can then be made at the level of one-dimensional or multi-dimensional momentum characteristics. It can be seen that in this attribute classification scheme every component has all these momentum characteristics. It, therefore, does not aid in the differentiation between the components if generic components are added to the CCD with this classification scheme. Utilizing a PID supplement appears to be more appropriate.

FIG. 5 shows the grouping of generic components by the attributes of FIG. 4. The components at the lower levels of the tree inherit all the attributes of the parent components above it. For example, the component "closed 3-way MOV" has the multi-D attribute, the independent of flow direction blocking attributes, the non-TH signal controllability, the passive attribute and the $Q_{mom}$ T-H function of the generic components above it. As we ascend the tree, attributes and in this case descriptors are dropped from the component labeling. That this CCD classification scheme is an advantage in the portability of the inventive process transient management module is best illustrated by using the PORV. The PORV is a pressure operated relief valve. The labeling "pressure operated" points to the lowest level attribute in FIG. 4 where it can be seen that the PORV requires $\Delta p>0$. The label "relief" gives it the flow direction dependence non-controllability and blocking attribute while the "valve" label gives it the passive attribute and the $Q_{mom}$ function. Furthermore, in both the case of the PORV and the case of the closed 3-way MOV, the PID blueprint will show a unique generic symbol. So a generic classification in the CCD is convenient and appropriate. All this attribute information is directly available from the PID blueprint. Interfacing with the PID electronic database provided by CAD (Computed Aided Design) tools should provide this information.

With this classification of generic components by T-H attributes available in the CCD, the PRD first principle rules for momentum management can be couched in generic T-H system and plant-independent rules. These rules are used in the following algorithm which achieves the transient management goal of compensating for the T-H function imbalance. We illustrate here with regard to the subgoal of "search loop for other Q-comp components." Bypass and isolation can also be treated by the same process.

(1) PRODIAG passes to the process transient management module the location and identity of the malfunctioning $Q_{mom}$ component which caused the transient upset.

(2) Starting at the downstream junction closest to the malfunctioning $Q_{mom}$ component a forward search is made in the direction of the momentum, junction by junction, for the list of components serviced by this $Q_{mom}$ component until the closest junctions upstream of the malfunction component or a boundary condition is reached.

(3) During the forward search once a component that is blocked to momentum (flow) is encountered the search will look for an alternative path at the closest upstream junction. The generic first principle rule is IF (component has block attribute) THEN start in another direction at closest upstream junction (A.1).

This search is basically a search in the direction of the steady-state flow pattern (down the pressure gradient) existing at the normal operating condition. Other generic rules have been developed similar in form to rule (A.1) which are used in the forward search.

(4) Once the list of components serviced by the malfunctioning $Q_{mom}$ is available, it is prioritized by the importance of the T-H function of the components; $Q_{eng}$ components are the most important components.

(5) A backward search then proceeds to find an alternative $Q_{mom}$ component to service the $Q_{eng}$ component. The backward search starts at the upstream junction closest to the $Q_{eng}$ component. It searches in the direction opposite to the steady-state flow direction (upstream) until either a boundary condition or the downstream junction closest to the $Q_{eng}$ is reached. If no alternative $Q_{mom}$ component with the desired attributes is found in this path, the path is discarded. Otherwise, it is retained in the list of possibilities. Additional criteria have to be developed to prioritize the acceptability of each alternate path. One of those criteria can be potential capacity (momentum magnitude). Alternatively, a probabilistic risk assessment or simulator program could be used for the prioritization. Additional algorithm development will be required if the path terminates in a boundary condition. A complementary alternate path will have to be found to match this path and complete an open loop.

(6) During the backward search paths are now allowed through blocked components if operator action can be taken to unblock them. This would then determine the list of operator actions required to realign and actuate an alternative to the malfunctioning component. The generic first principle rule is IF (component has block attribute and controllability attribute) THEN continue path search (B.1).

Other generic rules have been developed similar in form to rule (B.1) which are used in the backward search. Attributes such as dependency upon direction (check valve) are used in these rules to help better limit the search with physical laws of T-H response.

This illustrates the conceptual framework for the search algorithm which has been developed. It can be seen that while the steady-state momentum (flow) direction is required in search steps (3) and (5), this momentum direction can be determined a priori by modifying the forward search step (3). Starting at an active $Q_{mom}$ component in the predefined direction of the momentum at that component or at an inlet boundary condition in the predefined direction of the momentum at that boundary condition, the search proceeds from junction to junction with the stipulation that the path not include the same junction twice and that the search stops at the other end of the active $Q_{mom}$ component or at an outlet boundary condition. With this algorithm the momentum direction throughout the T-H system can be determined with only the predefined momentum direction at the active $Q_{mom}$ components and the boundary conditions.

The present approach to the automated construction of alternate flow paths is based on the premise that any system can be described by a series of interconnected segments, each defined by one inlet and one outlet junction. Each junction can have up to a maximum of three segments attached to it (a current limit imposed for development purposes). The relationships between the junctions and segments are stored in one of several files in the PID database used by the search program.

When a given component is identified as faulted, the segment containing that component is identified from the database. The search program is invoked in a forward-search mode, starting at the outlet junction of the failed segment. Following normal flow paths, all loops (open and closed) that are serviced (i.e., receive flow from) by the failed segment are tracked and stored in a table. Each of these loops is examined to see if it contains any important components. Important components are defined as those whose function is critical and must be maintained if the process or plant is to remain on-line, or whose function is necessary for the safety of the system. Starting from the inlet junction of any segment containing an important component, the search program is then run in backward-search mode to construct either (a) all loops than can deliver flow to the important component or (b) all loops that can function as a bypass around the failed segment. During this search, normally closed valves may be opened and segments whose flow may be reversed are included in potential paths. The parameters associated with the components of each new loop are examined to see if they match or exceed those necessary to meet the requirements of the important component. If the new loop meets those requirements, it is added to a table of recommended alternate paths. Currently, the search code results are presented using a stand-alone graphical interface. In its final form, the code will not only present the graphical solution, but create a list of instructions (e.g., close Valve A, open Valve B) for the operator.

All of the code modules developed to this point for the inventive process transient management module are written in the Fortran 90 language, developed on an IBM-compatible personal computer and compiled with the Lahey Fortran LF90 compiler. Table I shows an overall view of the steps required to generate a system database, search for new paths and display the results. Included in Table I are the names of files that are created or used by the various modules in the system.

In order to create alternate flow loops and evaluate their thermal-hydraulic capacities, detailed information about segment interconnections, component properties and system requirements must be tabulated in a searchable database. A large fraction of the preparation work for the inventive process transient management module was centered on the development of this database, which consists of several computer files. The first section of Table I shows the steps used in the development of a single system database. In general, the final database will be a representation of the Component Classification Dictionary (CCD) used by PRODIAG. This CCD is based on the premise that each component can be assigned to one of three basic classes: energy, mass or momentum. Each of these basic categories contains many generic components such as heaters and heat exchangers in the energy category. Each of these generic component classes is then subdivided further into specific component types. For example, heat exchangers may be regenerative or non-regenerative. The CCD up to this point is completely general, and the properties of each type of component are not system dependent. The final subdivision of the CCD incorporates the data from the system PID to assign each specific component in the PID to one of the CCD component types.

This invention relates to an expert system involving the management of process component malfunctions. Conventional expert system methods for management of process component malfunctions are based upon heuristically derived operator procedures translated into computerized format. Predetermined sequences of recommended operator actions for responding to a predetermined set of malfunctions are coded into the databases of these expert systems. In contrast, this new expert system method for the management of process component malfunctions is based upon generic thermal-hydraulic (T-H) first principles. The automated reasoning inference engine of the expert system is used to operate upon these fundamental physical principles coded into the knowledge base to produce recommended sequences of operator actions in response to each diagnosed component malfunction. Unlike the conventional expert systems, unanticipated component malfunctions can be accommodated by this method. The knowledge base of this method is structured at the thermal-hydraulic process component level and not at the thermal-hydraulic process system level. Each specific component is classified by its thermal-hydraulic function, the generic qualitative physical rules for that function, and the generic and specific component characteristics for that function.

Generic classes of components are defined in the knowledge base according to the three T-H functions of mass, momentum and energy transfer. This is the Component Classification Dictionary (CCD). This knowledge base is then used to produce possible realignments of component configurations in the process system to respond to the T-H function imbalance caused by the malfunctioning component. Using the junction connectivity information in the system Piping and Instrumentation Diagram (PID) database, a component-to-component linkage search is performed using the CCD component attributes and process objectives as constraints to produce the possible component realignments. The search algorithm is governed by the IF-THEN rules of the Physical Rules Database (PRD), which is based upon first principles conservation of mass, momentum and energy so that qualitatively T-H fundamental principles are satisfied for the new system configurations. Each realignment to a new configuration produces the accompanying sequence of recommended operator actions. This qualitative, physics-based search algorithm generically applies for the possible process system objectives of remaining at full capacity, reduction to partial capacity and safe shutdown of the process system.

The algorithm is generally comprised of a forward search and a backward search. The forward search is summarized as follows: given the T-H function and location of the malfunctioning component, follow the momentum flow paths, segment by segment, applying conservation of momentum and the component momentum attributes from the CCD to construct all possible flow loops (both open and closed) which contain the malfunctioning component; then prioritize all the important components in these loop(s) according to T-H function class. The backward search then follows the procedure of the forward search but is looking for all loops which run through the important components on the priority list and also through the possible replacement components in the same T-H function class as the malfunctioning component. In the backward search, operator control of components is permitted and this search then produces the realigned configurations and the sequences of operator actions. After these sets of operator actions are determined, quantitative technical specifications such as system capacity are employed to further narrow the possible set of operator action sequences with the aid of a systems simulator. An additional interface to a PRA (probabilistic risk assessment) package could further filter the possible set of operator action sequences by adding probabilistic criteria such as minimum risk or maximum reliability to select an optimum sequence of operator actions.

TABLE I

PROMANA System Code Module Sequence

| Input Files | Code Modules | Output Files |
|---|---|---|
| | Database Development | |
| | Text Editor | junction.dat<br>segments.dat |
| junction.dat<br>segments.dat | SEGTEST4 | jcnsort.dat |
| segments.dat | MAKECOMP<br>Text Editor | comps.dat |
| comps.dat | CVTCOMP | comps.bin |
| system.tif | PTIMAGE | system.pti |
| system.pti | READPTI<br>Text Editor | plotsegs.dat |
| plotsegs.dat | PLTCONVT<br>Path Search | plotsegs.bin |
| segments.dat<br>jcnsort.dat<br>comps.bin | SEARCH9 | allpaths.nnn |
| | Path Display | |
| allpaths.nnn<br>plotsegs.bin | MAKEGRAF | graph_n |
| | Database Development | |
| system.tif<br>system.pti<br>graph_n | PTIMAGE | |

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A method for managing the operation of a system having a plurality of components following a malfunction of a component, wherein each component is assigned a thermal-hydraulic function in terms of mass, momentum or energy, said method comprising the steps of:

assigning each component to a loop in the system, where the loop may be closed or open and connect to other loops at junctions or tanks, and wherein each component in a given loop is connected to the other components in said given loop and where each loop has a characteristic set of thermal-hydraulic parameters and is connected to one or more other loops;

identifying a first malfunctioning component in a first loop and classifying the malfunction in terms of a mass, momentum or energy thermal hydraulic function;

searching the loops for components connected to said first malfunctioning component;

searching said first loop for a second component of said loop of the same thermal-hydraulic function type as said first malfunctioning component;

generating a first modified loop structure wherein said second component having the same thermal-hydraulic function type as the malfunctioning component replaces said first malfunctioning component;

calculating and comparing thermal-hydraulic parameters of said first modified loop incorporating said second component with the thermal-hydraulic parameters of said first loop incorporating said first malfunctioning component prior to the malfunction; and reconfiguring said system to include said second component in said first modified loop if the thermal-hydraulic parameters of said first modified loop and of said first loop incorporating said first malfunctioning component prior to the malfunction match; or generating a second modified loop structure incorporating a third component having the same thermal-hydraulic function type as the first malfunctioning component for replacing the first malfunctioning component if the thermal-hydraulic parameters of the first loop and of the first modified loop do not match;

calculating and comparing thermal-hydraulic parameters of the second modified loop structure incorporating said third component with the thermal-hydraulic parameters of the first loop incorporating said first malfunctioning component prior to the malfunction; and reconfiguring the system to include said third component in said second modified loop structure if the thermal-hydraulic parameters of said second modified loop match the thermal-hydraulic parameters of said first loop.

2. The method of claim 1 wherein the step of identifying said first malfunctioning component includes identifying a loop location of said first malfunctioning component in said first loop and a specific component or a list of possible components as said first malfunctioning component.

3. The method of claim 2 further comprising the step of defining each loop in terms of an ordered list of components arranged in a direction of flow of a process being carried by said system.

4. The method of claim 1 wherein the steps of generating a second modified loop structure and calculating and comparing said thermal-hydraulic parameters of said second modified loop with said first loop continues repeatedly until a component of the same function type as said malfunctioning component is found or until said second modified loop structure is generated in another loop if the thermal hydraulic parameters of the first loop and of the second modified loop do not match.

5. The method of claim 1 further comprising the step of generating an ordered list of loops connected to said first loop by searching for junctions connecting said first loop to other loops.

6. The method of claim 5 wherein the step of searching for junctions connecting said first loop to other loops first employing principles thermal-hydraulic rules and component thermal-hydraulic attributes begins at the location of said first malfunctioning component in said first loop, with said searching first proceeding downstream from said first malfunctioning component followed by searching upstream from an identified serviced component.

7. The method of claim 1 further comprising the step of continuing the generating of a modified loop structure in a next loop connected to said first until a component having the same thermal-hydraulic function type as the malfunctioning type is located and the thermal-hydraulic parameters of said first loop and of said next loop match.

8. The method of claim 7 further comprising the step of terminating the operation of the system if a match of the thermal-hydraulic parameters of said first loop incorporating said first malfunctioning component with the thermal-hydraulic parameters of another loop cannot be found.

9. The method of claim 8 further comprising the step of performing a safety function check of the system following shut down of the system.

10. The method of claim 1 wherein the step of calculating and comparing thermal-hydraulic parameters of a modified loop with the thermal-hydraulic parameters of said first loop includes comparing the thermal-hydraulic parameters of a modified loop with a target function for all energy and mass components in said first loop.

11. The method of claim 1 further comprising the step of reconfiguring the system to include another component to operate the system at reduced power or capacity if the thermal-hydraulic parameters of a modified loop incorporating said another component provide a portion of the capacity of the first loop incorporating said first malfunctioning component prior to the malfunction.

12. The method of claim 11 further comprising the step of performing a safety function check following operation of the system at reduced power or capacity.

13. The method of claim 1 further comprising the step of reconfiguring the system to include another component to operate the system at full power or capacity if the thermal-hydraulic parameters of a modified loop incorporating said another component provide full power or capacity of the first loop incorporating said first malfunctioning component prior to the malfunction.

14. The method of claim 13 further comprising the step of performing a safety function check following resumption of operation of the system at full power or capacity.

15. The method of claim 9, 12 or 14 wherein the step of performing a safety function check includes determining if a modified loop affects high-level safety functions.

16. The method of claim 1 further comprising the step of prioritizing valid solutions in accordance with predetermined criteria, a probabilistic risk assessment for a system simulator.

* * * * *